Sept. 16, 1952   C. STEENSTRUP   2,610,873
SHAFT SEAL
Filed May 21, 1946

Inventor:
Christian Steenstrup,
by Edwin L. Rich
His Attorney.

Patented Sept. 16, 1952

2,610,873

UNITED STATES PATENT OFFICE 2,610,873

SHAFT SEAL

Christian Steenstrup, Schenectady, N. Y., assignor to General Electric Company, a corporation of New York Application May 21, 1946, Serial No. 671,301

4 Claims. (Cl. 286—11)

This invention relates to seals for preventing the leakage of lubricant or other fluid along a rotating shaft, and particularly to seals suitable for use with shafts operating at relatively high speeds.

When a device, such as a sealed compressor, is mounted in a closed casing and driven by an external prime mover, it is necessary to provide a seal about the driving shaft between the compressor and the prime mover for preventing the leakage of gas or oil from the casing through the shaft aperture. For example, when sealed refrigerant compressors are provided with external motors, it is a common practice to provide a shaft seal which comprises a sealing ring on the shaft and a complementary ring resiliently pressed against the shaft ring and sealed to the casing. Both rings are of rigid material with lapped contact surfaces and during operation an effective seal is provided. It has been found that when a seal of the type conventionally employed on refrigerant compressors is used with shafts operating at relatively high speeds, say of the order of 7000 R. P. M., the rings may chatter and the effectiveness of the seal thus be destroyed. Accordingly, it is an object of this invention to provide an improved shaft seal for preventing the leakage of fluids along a shaft rotating at relatively high speeds.

Further objects and advantages of the invention will become apparent as the following description proceeds, and the features of novelty which characterize the invention will be pointed out with particularity in the claims annexed to and forming a part of this specification.

Figure 1:
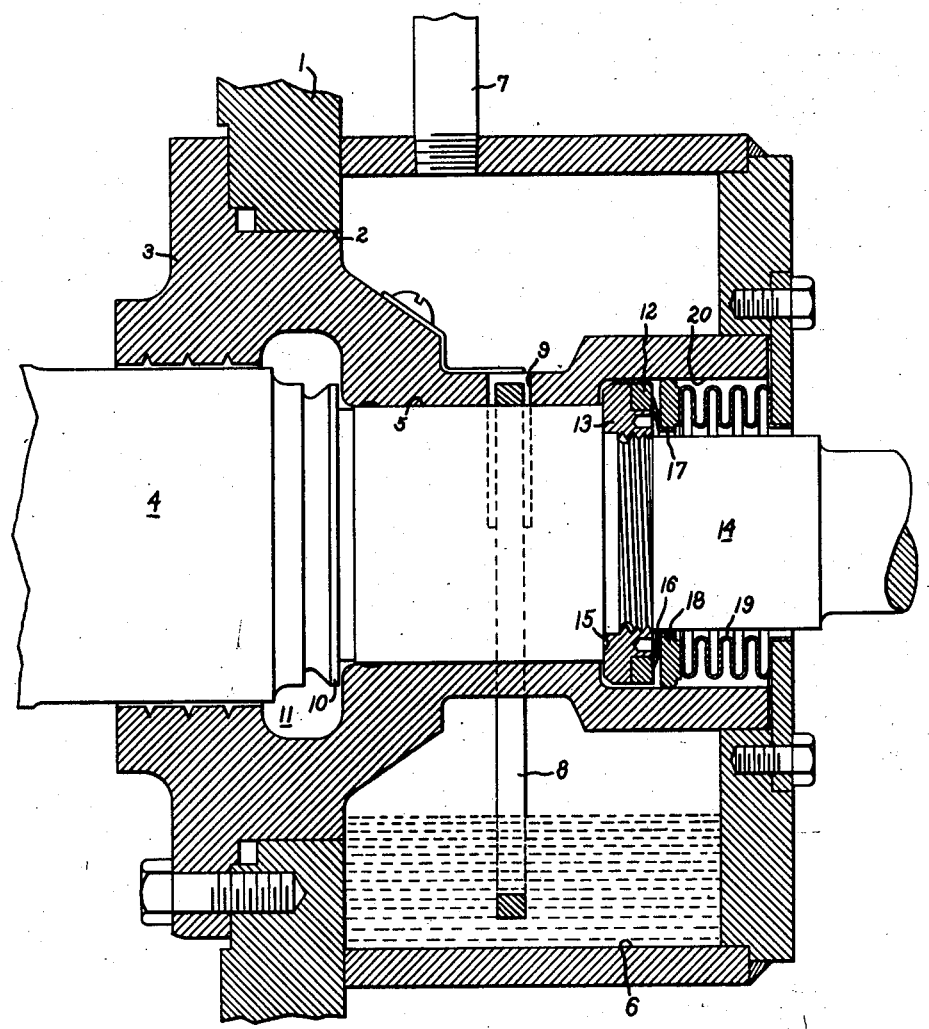
Figure 2:
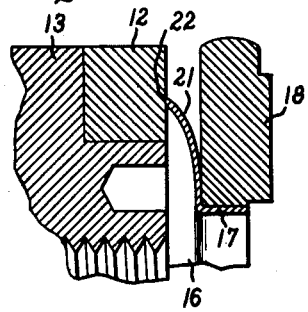

For a better understanding of the invention, reference may be had to the accompanying drawing in which Fig. 1 is a sectional elevation of the journal bearing portion of a compressor provided with a shaft seal embodying the invention, and Fig. 2 is an enlarged sectional view of the sealing members.

Referring now to the drawing, a compressor (not shown) is mounted within a closed casing or housing 1 having an opening 2 which receives a bearing block or assemly 3. A shaft 4 for driving the compressor is journaled in the bearing block 3 and extends through a shaft aperture 5 formed in the block. An oil reservoir 6 is formed about the bearing and is supplied with oil through a connection 7 at the top thereof. Oil is carried to the shaft 4 by an oil ring 8 which engages the shaft at the top thereof in a slot 9 formed in the upper side of the bearing block 3. Oil which creeps along the bearing toward the compressor is carried to a flange 10 and is thrown outwardly by centrifugal force and collected in an annular pocket 11 from which it is withdrawn by a suitable drain (not shown). In order to prevent the loss of oil to the outside of the casing, a shaft seal is provided at the right-hand end of the shaft. The seal comprises an annular sealing member or ring 12 of suitable hard, wear-resisting material, such as hardened steel, which is mounted in a retaining ring 13 threaded on a reduced portion 14 of the shaft and resting against an annular shoulder 15 formed by reducing the section of the shaft. A stationary sealing member 16 is mounted in engagement with the ring 12. The sealing member 16 is of dished form and has a flange 17 rigidly secured to a guide ring 18, which in turn is urged toward the ring 12 by a resilient metal bellows 19. The ring 18 is slidably mounted within a cylindrical recess 20 formed at the outer end of the bearing block 3, the outer periphery of the ring engaging the walls of the recess.

The details of construction of the dished disk 16 are shown in Fig. 2. The disk 16 is constructed of a suitable flexible metal which is sufficiently soft to provide a good sealing surface; it has been found that eight per cent tin bronze is a suitable metal for this purpose. The dished portion of the disk 16 indicated at 21 is curved outwardly away from the ring 18 so that it presents a concave curved surface toward the ring 12. The periphery of the disk around the edge of the portion 21 engages the sealing ring 12, as indicated at 22, the edge of the disk being ground so that it provides a narrow, flat sealing surface under the normal pressure prevailing between the sealing members. It has been found that during the operation of this seal the periphery of the flexible disk closely follows the movements of the hard-surfaced ring 12 during its rotation with the shaft. The curving of the portion 21 of the disk 16 provides additional flexibility and insures effective maintenance of the sealing engagement with the ring 12. A seal constructed as described effectively prevents chattering during high speed operation of the shaft and leakage of lubricant or gas is minimized. From the foregoing it is readily apparent that a simple and effective shaft seal construction has been provided which maintains an effective seal during relatively high speed rotation of the shaft and without chattering or bouncing, which might otherwise impair the efficiency of the seal.

Obviously, the seal described above may be employed to prevent leakage of fluid into a mechanism such as a compressor with the same effectiveness as in the arrangement illustrated. For example, the compressor might be considered as connected with the casing and driven by the right-hand end of the shaft 4, the motor then being on the outside of the casing at the left.

While the invention has been described in connection with a seal of a particularly construction employing specific materials, other embodiments will occur to those skilled in the art. It is not desired, therefore, that the invention be limited to the construction illustrated and described and it is intended by the appended claims to cover all modifications within the spirit and scope of the invention.

What I claim as new and desire to secure by Letters Patent of the United States is:

1. A shaft seal comprising a casing provided with a shaft aperture, a rotatable shaft extending through said aperture, means providing an annular shoulder on said shaft, a first annular sealing member mounted against said shoulder, a ring surrounding said shaft, a second annular sealing member on said ring, and a resilient sealing means for securing said ring to said casing and for maintaining said sealing members in engagement during rotation of said shaft, one of said sealing members being composed solely of a dished disk of flexible metal arranged to have peripheral contact with the other of said members.

2. A shaft seal comprising a casing provided with a shaft aperture, a rotatable shaft extending through said aperture, means providing an annular shoulder on said shaft, an annular sealing member of hard material mounted against said shoulder, a ring surrounding said shaft and movable axially thereof, a dished disk of flexible metal secured to said ring and arranged to have peripheral engagement with said annular sealing member, said disk constituting the sole element engaging said sealing member, and a resilient sealing member secured to said ring and to said casing for preventing leakage of fluid between said ring and said casing and for urging said disk into engagement with said annular sealing member.

3. A shaft seal comprising a casing provided with a shaft aperture, a rotatable shaft extending through said aperture, said aperture having a cylindrical wall portion spaced from said shaft and concentric therewith, an annular shoulder on said shaft, an annular sealing member of hard material mounted against said shoulder, a ring surrounding and spaced from said shaft and mounted in sliding engagement with said cylindrical wall portion whereby said ring is slidable in said aperture axially of said shaft, a dished disk of flexible metal secured to said ring and having peripheral contact with said sealing member, said disk constituting the sole element engaging said sealing member, and a resilient metal bellows for sealing said ring to said casing and for maintaining said disk in engagement with said sealing member during rotation of said shaft.

4. A shaft seal comprising a casing provided with a shaft aperture, a rotatable shaft extending through said aperture, means providing an annular shoulder on said shaft, an annular sealing member of hard material mounted against said shoulder, a ring surrounding said shaft and movable axially thereof, a dished disk of flexible metal secured to said ring, said disk being secured to said ring near its inner periphery and being formed to curve outwardly away from said ring toward said annular sealing member and being arranged to have peripheral engagement with said member, and a resilient sealing member secured to said ring and to said casing for preventing leakage of fluid between said ring and said casing and for urging said disk into engagement with said annular sealing member.

CHRISTIAN STEENSTRUP.

REFERENCES CITED

The following references are of record in the file of this patent:

UNITED STATES PATENTS

| Number | Name | Date |
|---|---|---|
| 750,766 | Hibbard | Jan. 26, 1904 |
| 1,602,177 | Spreen | Oct. 5, 1926 |
| 2,100,220 | King | Nov. 23, 1937 |
| 2,195,496 | Reed | Apr. 2, 1940 |

FOREIGN PATENTS

| Number | Country | Date |
|---|---|---|
| 19,968 | Great Britain | of 1909 |